United States Patent [19]

Alvarez et al.

[11] 4,248,945
[45] Feb. 3, 1981

[54] DRY CELL BATTERY

[76] Inventors: Mario Y. Alvarez; Oscar Mejia, both of Avenida 39 No. 14-92, Bogota, Colombia

[21] Appl. No.: 773,153

[22] Filed: Mar. 1, 1977

Related U.S. Application Data

[63] Continuation-in-part of Ser. No. 657,293, Feb. 11, 1976, which is a continuation-in-part of Ser. No. 446,900, Feb. 28, 1974, abandoned.

[30] Foreign Application Priority Data

Nov. 9, 1973 [CO] Colombia .............................. 142075

[51] Int. Cl.³ ............................................ H01M 6/06
[52] U.S. Cl. ..................... 429/194; 429/229; 429/164; 429/224; 429/232
[58] Field of Search ............... 429/224, 229, 230, 194, 429/232, 218, 164, 198, 199

[56] References Cited

U.S. PATENT DOCUMENTS

| 215,899 | 5/1879 | Ehrenberg | 429/198 |
|---|---|---|---|
| 1,123,843 | 1/1915 | Burger | 429/232 X |
| 1,160,907 | 11/1915 | Koretzky | 429/224 X |
| 1,201,481 | 10/1916 | McGall et al. | 429/190 |
| 1,296,700 | 3/1919 | Ruhoff | 429/232 X |
| 1,480,533 | 6/1924 | Clymer | 429/224 X |
| 1,518,637 | 12/1924 | DeOlaneta | 429/224 X |
| 1,906,784 | 5/1933 | Aden | 429/198 |
| 3,019,141 | 1/1962 | Priebe | 429/199 X |

FOREIGN PATENT DOCUMENTS 641427  8/1950  United Kingdom .

*Primary Examiner*—Anthony Skapars
*Attorney, Agent, or Firm*—Browdy and Neimark

[57] ABSTRACT

A dry-cell battery construction includes a zinc electrode and a graphite electrode. An external electrolyte of a raw paste material from vegetal origin contacts the zinc electrode. The external electrolyte is preferably raw paste material of the fruit of the carica papaya. The filler material which contacts the graphite electrode contains carbon black. The carbon black may be acetylene black, but can be carbon black of other types, preferably petroleum black, but also oven black or the like, including carbon black produced from natural gas.

17 Claims, 1 Drawing Figure

U.S. Patent
Feb. 3, 1981
4,248,945
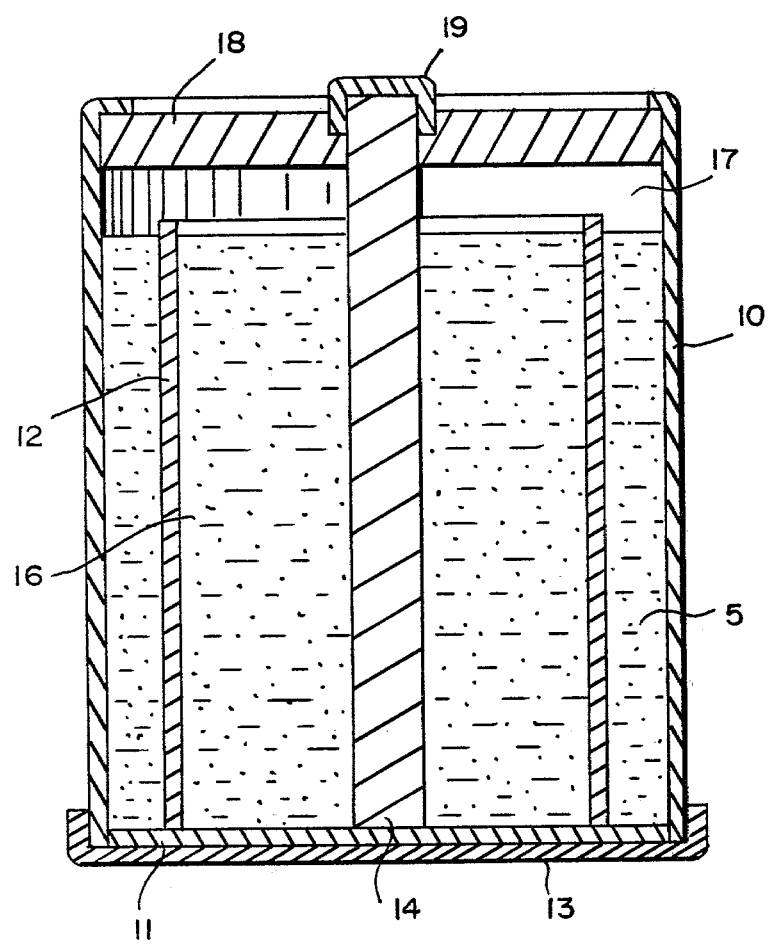

DRY CELL BATTERY

CROSS REFERENCE TO RELATED APPLICATION

This application is a continuation-in-part of the co-pending application of Mario Yankel Alvarez et al entitled "Electrolytic Device" filed Feb. 11, 1976 under Ser. No. 657,293 which, in turn, is a continuation-in-part of the application of Mario Yankel Alvarez et al entitled "Dry Battery Construction" filed Feb. 28, 1974 under Ser. No. 446,900, and now abandoned. The disclosures of these prior applications are incorporated herein entirely by reference.

FIELD OF THE INVENTION

This invention relates to a dry cell which includes carbon black, preferably petroleum black, and urine as constituents of the depolarizing mixture or internal electrolyte which is positioned about its carbon electrode, this internal electrolyte being placed within a zinc capsule whose interior surface, in turn, is homogeneously covered by an organic electrolyte, principally composed of the fruit carica papaya, and acting as external electrolyte.

BACKGROUND OF THE INVENTION

The dry-cell construction Leclanche devised by 1868 affords the basic principle on which the present time dry or primary batteries are constructed. According to Leclanche's construction, a carbon plate or rod was encircled by a mixture of powdered carbon and manganese dioxide, with an amount of 10-20 weight percent ammonium chloride solution. Manganese chloride was sometimes added. As the battery case, zinc sheet was used.

A 1.5 volt changing tension was obtained. From such value the tension slowly dropped off, with an actual average value being from 1.2 to 1.3. During its inactive condition, the original tension was nearly wholly regained, the battery being so particularly useful for intermittent action.

The general chemical reaction involved is now expressed as follows:

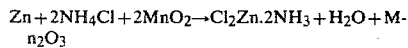

$$Zn + 2NH_4Cl + 2MnO_2 \rightarrow Cl_2Zn.2NH_3 + H_2O + Mn_2O_3$$

Dr. Carl Gassner in 1888 improved the Leclanche cell, originating the first dry-cell battery. The improved battery was comprised of a zinc case, acting as both the battery anode and its container. A gel-like electrolyte was put up within such container and a carbon rod, encircled by depolarizing mixture, was located at the center thereof. This is the basic construction followed at the present for manufacturing commercial dry batteries, of any model, which are currently used to generate low-voltage electric power.

Broadly, the electrolyte heretofore used for dry batteries has consisted of a gel-like body containing therein about 20 weight percent ammonium chloride and 9 weight percent zinc chloride, arranged between the battery anode and cathode. Such gelly paste usually comprises a mixture of the electrolyte substance and corn starch and wheat meal. Synthetic materials affording improved electrical properties and longer shelf life, such as methylcellulose, Cellosolve and the like, are also used.

It is well known that during the discharging process the battery electrolyte changes in composition. In the layer adjacent the zinc electrode the pH value changes from about 5.7 to about 3.8 (thus becoming more acidic) while in the innermost region the pH of the mixture changes from about 5.8 to 11 (more alkaline).

Dry batteries comprising the aforecited conventional electrolyte, generally show a steady slow rate characteristic of discharge, until reaching the 1-volt final tension, when discharging at 20° C. The electrical tension of the battery continuously decreases as it discharges. The rated capacity depends upon, therefore, the intended final tension. For comparison purposes, when testing commercial Size D batteries, at a 4 ohms load, the results set forth in the following Table I are obtained, for different final tensions.

TABLE I

| Final Voltage | Time Hrs. | Ah | Watts-Hr. | Wh/kg. |
|---|---|---|---|---|
| 1.4 | 0 | 0 | 0 | 0 |
| 1.2 | 0.25 | 0.244 | 0.317 | 0.31 |
| 1.0 | 2.35 | 0.681 | 0.792 | 8.27 |
| 0.9 | 3.50 | 0.955 | 1.04 | 10.87 |
| 0.8 | 5.50 | 0.37 | 1.37 | 14.33 |

Another kind of electrolyte uses 20 weight percent caustic soda, in which the zinc goes into reaction to form sodium zincate, the hydrogen released being absorbed at the carbon surface by the atmospheric oxygen occluded within the electrolyte, thus spending air at a rate above 1 liter in one hour. In order to decrease the hydroxyl ion consumption, calcium hydroxide, which is scarcely soluble, is added to the electrolyte, thereby forming soluble calcium zincate being so reclaimed the sodium hydroxide. The electrolyte in this latter kind of dry batter is held in place by adding thereto corn starch paste. Preferably, the miniature 5.5 ampere-hour dry batteries are so constructed.

Also, the electrolyte may be comprised of 35-40 weight percent potassium hydroxide saturated with sodium zincate, supported on alpha-cellulose.

The aforecited prior art batteries have a rather short life as contrasted to that one attainable in the batteries according to the invention as disclosed in the above-mentioned U.S. patent application Ser. No. 657,293 and 446,900.

It is known to provide, as the depolarizing mixtures in conventional dry cells, a mixture which includes manganese dioxide, graphite, roasted coke, acetylene black, ammonium chloride, zinc chloride and other less important constituents. It is believed that acetylene black, as opposed to other types of carbon black, has been used because of its relatively superior low resistance and superior absorption characteristics. The use of other types of carbon black has not proved feasible in the construction of commercial dry cell batteries.

While it has been proposed, as known from U.S. Pat. No. 215,899, to use urine as an electrolyte (excitant) in Galvanic batteries, it has not heretofore been known to use urine in a dry cell to reduce its internal resistance and to increase the absorption of carbon black.

SUMMARY OF THE INVENTION

It is an object of the present invention to provide a dry cell battery which contains a depolarizing mixture or internal electrolyte which need not include acetylene black.

It is another object of the present invention to provide a dry cell battery which includes a depolarizing mixture or internal electrolyte containing a carbon black other than acetylene black, preferably petroleum black.

It is a further object of the present invention to provide a dry cell battery which includes acetylene black and has an extended life and improved characteristics, using as external electrolyte one made up of an organic substance such as carica papaya.

It is an additional object of the present invention to provide a depolarizing mixture suitable for use in dry cell batteries.

The foregoing objects are achieved, in accordance with the present invention, by providing a dry cell battery having among the constituents of its depolarizing mixture or internal electrolyte carbon black and urine.

The carbon black, in accordance with the present invention, is preferably petroleum black, but may also be oven black or the like, as well as acetylene black.

Applicants have discovered that if, in a dry battery comprising an anode and a cathode separated from one another by means of a permeable web, such as absorbent paper, a raw paste material from vegetal origin, especially paste material of fruit of the carica papaya, is used as the battery external electrolyte according to this invention, surprisingly a longer lasting actual duration of discharge is attained, with such discharge occurring at a more steady rate, as contrasted to the whole performance of the prior art batteries. This type of battery is further improved by using as constituents of its depolarized mixture urine and carbon black which gives far greater power of absorption.

The mayor barrier heretofore to the substitution of lower varieties of carbon black, such as petroleum black, for acetylene black in dry cells is believed to lay in that these are too porous and insufficiently absorbent, and consequently not apt for use in the internal electrolyte. Applicants have found that, by mixing manganese dioxide, graphite, ammonium chloride plus urine, petroleum blacks and the like have their power of absorption greatly enhanced, making such blacks roughly equal to that of acetylene black. The substances of the mixture are believed to be absorbed in such a manner that they compact the groups of molecules of the petroleum blacks and the like, making these blacks more conductive and usable in the manufacture of dry cells similar as to voltage, amperage, durability and use to those made with acetylene black.

Absorption has been found by applicants to be substantially and equally high when the depolarizing mixture consists of, on the one hand, acetylene black, graphite, ammonium chloride, and manganese dioxide as is conventional, and on the other hand, petroleum black, graphite, ammonium chloride, manganese dioxide plus urine in accordance with the present invention.

Hence, by treatment with urine in the depolarizing mixture, petroleum blacks and the like are made to have absorption characteristics similar to those of acetylene black. These results are optimum within the dry cell makeup if the paste of a fruit, preferably carica papaya, gelled with any known gel-former (starch, etc.) and dried with a drying agent such as wheat meal, coffee, etc., is used as the external electrolyte, thereby producing a dry cell of 1.5 volts and up to 6 amperes with equal or greater effectiveness than the Leclanche type cells.

An electrolyte which may be used in a dry cell battery accoding to the present invention is comprised of raw paste material of vegetal origin, in particular of raw paste of fruit of the carica papaya (Carica papaya). By the term "raw material of vegetal origin" used throughout this description, raw pulp of fruits of plants and pulp of tree stalks is meant. If desired, such paste material may contain compounded therein, natural or synthetic neutral agents, such as yucca starch, corn starch, wheat meal, alpha-cellulose, and the like as gel-formers. Particularly suitable for forming the electrolyte is the paste obtained from the fruit of any kind of the varieties of the carica papaya (*Carica papaya*). This fruit is commonly known as the papaya. The dry battery embodying the electrolyte of papaya squash shows a steady tension drop rate, rather than the jerking-wise drop from one tension level to another lower one, as in the case with the prior art batteries.

BRIEF DESCRIPTION OF DRAWING

The sole FIGURE of drawing is an elevational, cross-sectional view of a dry cell battery according to an illustrative embodiment of the present invention.

DETAILED DESCRIPTION OF THE PREFERRED EMBODIMENTS

The fruit paste of papaya or other fruit may be formed by liquefying the fruit and thoroughly mixing therewith the starch. The mixture is heated to about 80° C. with continuous stirring. When the paste has dried to some extent, adjuvants may be added. For example, wheat meal may be added as drying agent thereto and heated to keep the mixture boiling at 100° C. until a thick and sticky gel is formed which may suitably be adhered to the interior surface of the battery shell.

The pulp of fruits is comprised of a number of organic compounds, varying as to amount and class, depending on the subject fruit. Among such organic compounds there are organic acids, carbohydrates and proteins comprised of high-weight molecules. Without attempting to be limited to any particular explicative theory, it may be postulated that such high-weight molecules, probably on hydrolysis occurring in the electrolytic process performed in the dry battery, undergo structural changes of not well known nature, but that as a result they split into lower molecules which are capable of chelation with the metallic ions afforded to the system by the zinc metal, the manganese dioxide and those metals in trace amounts found as impurities in the cell container.

It is known that the metal chelated forms are apparently more soluble than the salts of their own metals and that, therefore, they will form a bridge of continuous solubilization, thus permanently acting as electrolytes for the dry battery comprising raw paste of fruits of plants. The mechanism of the process performed is not well known at the present, but its actual improved effectiveness is brought out by means of the following illustrative, non-limitative example.

EXAMPLE

To 7.60 g. of paste formed from the fruit of the carica papaya there is added as gel-formers 0.95 g. of yucca starch and 1.45 g. of wheat meal or coffee as drying agent with thorough mixing. The so-prepared mixture was gently heated at about 80° C. for 25 minutes using a water bath. About 10 g. of the above mixture were coated on the inner side wall of a zinc container weighing 18 g. A graphite rod weighing 4 g. was located at the center of the container provided on its bottom with an insulating cardboard disk. The rod was encircled by 34.4 g. of depolarizing mixture or internal electrolyte and this was wrapped with a thin web of absorbent paper. The above filler and depolarizing mixture was taken from the mix comprised of: carbon black from petroleum 17.8 g.; MnO$_2$ 8.9 g.; urine 7.7 g. and ammonium chloride 3.5 g.

A test was devised for comparing the performance of the dry battery of this invention against the prior art batteries. Commercial Size D dry batteries and dry batteries prepared as described in the above Example, having the same weight, were used. One commercial battery was applied to drive a first toy electrical locomotive. At the same time one battery according to the invention was used to drive a second toy electrical locomotive of the same weight as the first one. In both instances, the tracks were closed trackways having the same length and shape, arranged at the same horizontal plane. When some time lapsed the first locomotive stopped as its associated battery becomes weak enough. In contraposition, the dry cell battery of the present invention continued to drive the associated toy locomotive.

Among the fruits of plants applicants have found suitable in different degrees to constitute an electrolyte which may be used in some embodiments of the present invention are included pineapple, papaya, citrics and the like. Suitable materials are also tubers, for instance, yucca (*Manihot utilissima*) and tree parts, such as pine bark. The papaya has been shown to be by far the most suitable fruit.

Applicants have noted that the fruits of the following plants have also shown, to a limited degree, some promise of providing paste material having an electrolytic nature: Mandarin orange (*Citrus madurensis*); orange (*Citrus aurantium*); bergamot (*Citrus bergamia*); grapefruit (*Citrus deevmana*); pineapple (*Ananas sativus*); pear (*Pirus communis*); plum (*Prunus domestica*); cusard apple (*Anona muricata*); guava (*Psidium guajava*); tamarind (*Tamarindus indicia*); Indian mango (*Magnifera indica*); melon (*Cucumis melo*); tomato (*Lycopersicum esculentum*); Cucurbit (*Passiflora specierum*); eggplant (*Solanum melongenea*); lulo (*Datura stramonium*); pumpkin (*Adenostyles albiferous*); and potato (*Solanum tuberosum*).

The preferred proportions to form a suitable electrolyte paste are as follows, expressed in weight percent:

| | |
|---|---|
| Fruit of the carica papcya | 69.3–84.7% |
| Starch | 8.1–9.9% |
| Wheat meal | 12.6–15.4% | and especially fruit of the papaw tree 77%, starch 9% and wheat meal 14%. It should be understood, however, that the important consideration is that the jellylike mass formed by such substances be compact and adhesive, especially when the substance is to be used in a dry battery according to some embodiments of the present invention. On the other hand, it should be noted that the two gel-forming elements—starch and wheat meal—could be theoretically eliminated altogether and the papaya component could increase to 100%.

In the present battery a depolarizing filler or internal electrolyte comprising carbon black of many types or acetylene black is used along with the electrolyte comprising the raw paste of vegetal origin, preferably paste of fruit of the carica papaya. As is usually done in the manufacture of dry batteries, zinc chloride and/or manganese chloride may be used. One kind of carbon black used is Sterling V ® manufactured by Cabot Corp. This carbon black has a surface area of 30 m$^2$/g, particle size of 108 millimicrons and a volatile content of 1%, fixed carbon 99% and pH of 7.5. The electrical resistivity of this kind of carbon is low, its density is of about 41 kg/m$^3$. These properties altogether improve the shelf life, and upon mixing with urine, develop a power of absorption equal to that of acetylene black, as measured by the DBP test.

The depolarizing mixture range proportions, in one aspect of the present invention, are as follows:

| | Weight Percent |
|---|---|
| Carbon black | 35–70% |
| Manganese dioxide | 5–40% |
| Urine | 33.3% |

A specific example of a depolarizing mixture according to the present invention, within the ranges set out above, found to be preferred is constituted by carbon black 44.4%, urine 33.3% and manganese dioxide 22.2%, by weight.

The depolarizing mixture may include paste of fruit of carica papaya which increases the absorption. In this instance, the range of the mixture proportions are substantially as follows:

| | Weight percent |
|---|---|
| Carbon black (either) petroleum black or acetylene black) | 35–70% |
| Manganese dioxide | 35–40% |
| Carica papaya fruit paste | 10–12.5% |
| Urine | 10% |

A specific example of a preferred depolarizing mixture, which includes *Carica papaya* fruit paste, according to the present invention within the ranges set out above is constituted by carbon black from petroleum preferably 51.6%, manganese dioxide 25.9%, *Carica papaya* fruit paste 12.5% and urine 10%, by weight.

As stated above, urine is a necessary constituent of the depolarizing mixture or internal electrolyte according to the present invention. The urine may be of either human or animal origin. Non-limiting examples of the composition of human urine can be seen in Greyton, *Basic Human Physiology: Normal Functions and Mechanisms of Disease,* page 280, Table 24–1, W. B. Sanders Company, Philadelphia (1971) and Winton and Baylis, *Human Physiology,* page 250, Table 9.1, 5th Col., Little, Brown and Company, Boston (1962).

In the constructions of applicants battery the carbon electrode may be located at the center thereof encircled by a filler having therein the depolarizing mixture or internal electrolyte. Surrounding each filler is the permeable web and surrounding such web and contacting the zinc electrode, there is arranged the electrolyte comprised of the raw paste of fruit of the carica papaya having therein a suitable gel forming material.

As shown in the drawing FIGURE, an exemplary dry cell battery according to the present invention includes a cylindrical, external tubular electrode 10 of zinc which is positioned coaxially with a solid cylindrical, electrode 14 of graphite. A permeable web 12, which may be made of newsprint, or the like, is positioned between the zinc electrode 10 and the graphite electrode 11, it being positioned more closely to the zinc electrode 10. An electrical insulating disk 13 or the like is positioned beneath the electrodes 10 and 11. A star bottom washer 11 is fixed to the electrode 10 in contact with the disk 13.

An external electrolyte 15 comprised essentially of a raw paste material of fruit of the carica papaya or other pastes of vegetable origin, is provided between the zinc electrode 10 and the web 12. The electrolyte 15 desirably contains a gel forming amount of suitable gel forming material to make it compact and adhesive. The gel forming material may be starch and wheat meal, as stated above. In weight percentages, the starch is desirably present in the range of from 8.1% to 9.9%, the wheat meal is present in the range of from 12.6% to 15.4%, and the fruit of the carica papaya is present in the range of from 69.3% to 84.7%. A particularly effective battery is obtained by providing that the fruit of the carica papaya constitutes 77%, the starch constitutes 9% and the wheat meal constitutes 4% of the electrolyte by weight.

A depolarizing mixture or internal electrolyte 16 is provided between the web 12 and the graphite electrode 11. This depolarizing mixture 16 according to the present invention is composed of a novel mixture. The depolarizing mixture 16 is constituted by a mixture of the materials in the weight proportions set out above. The depolarizing mixture 16 may include, as mentioned above, raw paste of the fruit of the carica papaya. The urine effects a reduction in the internal resistivity of the depolarizing mixture by causing the manganese dioxide and the graphite to be absorbed by the carbon black from petroleum, allowing the substitution of ordinary carbon black for acetylene black as absorption capacity of the two become approximately equal. When acetylene black is used with urine, the characteristics of the battery are improved over the characteristics without the presence of urine. The carbon black may be in any of its forms, preferably petroleum black, but also oven black, thermal black from natural gas and coke black. Coke black has been found to be the least desirable of the available carbon blacks and is not recommended over the other carbon blacks for use in commercial batteries. It is believed that impurities in coke black detract from its function as an ingredient of a depolarizing mixture, at least in its ordinary commercially available form. Both the urine and the paste of fruit of the papaw tree augment the current and result in good voltage regulation. The urine causes the carbon black to absorb the other components of the internal electrolyte, thus substituting for the use of acetylene black other varieties of carbon black.

A gas-storing, expansion space 17 is provided between a conventional pitch seat 18 which extends between the graphite electrode 11 and the zinc electrode 10, as is conventional in dry battery construction. The battery can be provided with a steel jacket and bottom, if desired, or some other housing of conventional construction, the insulating disk 13 serving, in this case, to insulate the graphite electrode 11 from the steel bottom. The star bottom washer 14 need not be present in this alternate variant. The top of the graphite electrode 11 is provided with a brass cap 19 to facilitate making electrical connections. The electrode 10 of zinc serves both as a container and as a terminal connection of the battery.

Dry cell batteries constructed in accordance with the present invention exhibit high durability and long life, comparing favorably with present-day commercial batteries. Batteries constructed in accordance with the present invention provide an output of about six (6) amperes and a voltage of 1.5 volts.

Using standard procedures of the International Standards Organization, two dry cell batteries constructed in accordance with the present invention were tested by placing them in standard resistance load circuits. Both batteries were of standard size D and contained a depolarizing mixture according to the present invention. One of the batteries contained a conventional electrolyte; the other contained an electrolyte composed of raw paste material of fruit of the carica papaya. The results are set out below in Table II.

TABLE II

| Test Circuits Conditions | With Conventional Electrolyte | With Paste Material Electrolyte |
|---|---|---|
| 2.25 ohms, continuous | | |
| Cutting point 0.65 volts | 700 minutes | 800 minutes |
| 25 ohms, 4 hrs. every 25 hours | | |
| Cutting point 1.1 volts | 100 hours | 140 hours |
| Cutting point 9.9 volts | 90 hours | 110 hours |
| Watts-hours | 7.36 hours | 8.36 hours |
| 8 ohms, 4 hrs. every 24 hours | | |
| Cutting point 1.1 volts | 16 hours | 20 hours |
| Cutting point 0.9 volts | 39 hours | 46 hours |
| Watts-hour | 2.25 | 9.25 hours |

As can be seen from Table II, batteries made in accordance with the present invention have excellent energy storing capacity and good terminal voltage characteristics under load.

Each of the aforementioned types of batteries incorporating a depolarizing mixture according to the present invention maintained their shapes and retained their electrolytes under load for considerable periods. The battery provided with conventional external electrolyte did not exhibit gushing or spillage or became deformed under 2.25 ohm continuous or discontinuous load until the elapse of 70 days. The battery provided with the paste material of fruit of the carica papaya did not become deformed or exhibit gushing or spillage under the same conditions until the elapse of 90 days. One can conclude that batteries made in accordance with the present invention have significant lifetimes and are practical under load conditions.

Batteries constructed similarly to those of the present invention, substituting for the urine component in the depolarizing mixture, an electrolytic solution of the Ringer type, a solution well known in the medical arts, indicated that currents and voltages of such batteries declined rapidly relative to the batteries containing urine and carbon black as constituents of the depolarizer mixture. In particular, it was noted that an electrolyte solution of the Ringer type gave an initial voltage of 0.8 volts and a current 25 milliamperes. Using 30% of this solution with 60% carbon black and manganese dioxide, as a depolarizing mixture in a battery with a conventional external electrolyte comprising ammonium chloride, zinc chloride and a gel former, resulted in an initial voltage of 1.0 volts and a curent of 500 milliamperes. The voltage and current of these batteries, however, declined rapidly in comparison to batteries constructed with a depolarizing mixture in accordance with the present invention.

Using the same depolarizing mixture set out above, including Ringer solution, but substituting a paste of fruit of the carica papaya for the conventional external electrolyte, a battery resulted having an initial voltage of 1.3 volts, a current of 1.0 amps and a somewhat longer life, but again the voltage and current fell quickly in comparison to similar batteries using the depolarizing mixture of the present invention.

In a similar experiment 30% by weight paste of other organic substances, such as guava, apples, pineapple, tomato or the like, were added to a urine-free depolarizing mixture containing approximately 60% carbon black and 10% manganese dioxide, by weight. When this mixture was used in a battery having a conventional external electrolyte, an initial voltage of 1.3 volts with current in the range of from 1.1 to 1.5 amperes were obtained. If papaya in a gelatinous form is substituted for the conventional external electrolyte and used with these depolarizing mixtures, initial voltage 1.4 volts and initial currents of from 1.0-1.8 amperes were obtained. Cells so constructed exhibited better results than those using a solution of the Ringer type as set out above; nevertheless, life of these somewhat better batteries was still short in comparison to batteries of the present invention.

It can thus be seen that the use of urine in the depolarizing mixture gives unexpectedly superior results than other electrolytes.

It is to be understood that the various mixtures mentioned above which can form the depolarizing mixture according to the present invention, can in one preferred aspect of the invention, be pressed under pressure into shaped bodies, such as a web which can be formed into a spiral. These bodies shaped under pressure provide a somewhat increased current capacity for the depolarizing mixture when used in a battery, as compared to the same mixture which has not been subjected to pressure.

It is to be appreciated that the described and illustrated embodiments of the present invention have been set out by way of example, not by way of limitation. Other embodiments and numerous variants are possible within the spirit and scope of the present invention, its scope being defined in the appended claims.

What is claimed is:

1. In a dry cell battery having at least two electrodes spaced one from another, an electrolyte positioned between said two electrodes and a depolarizing mixture positioned adjacent one of said electrodes, the improvement wherein the depolarizing mixture consists essentially of carbon black, an oxygen producing substance, paste of fruit of the carica papaya and urine.

2. An improved dry cell battery in accordance with claim 1, wherein said carbon black is acetylene black.

3. An improved dry cell battery in accordance with claim 1, wherein said carbon black is carbon black produced from natural gas.

4. Improved dry cell battery in accordance with claim 1, wherein said carbon black is thermal black.

5. An improved dry cell battery in accordance with claim 1, wherein said carbon black is petroleum black.

6. An improved dry cell battery in accordance with claim 1, wherein said carbon black is oven black.

7. An improved dry cell battery in accordance with claim 1, wherein said oxygen producing substance is manganese dioxide.

8. An improved dry cell battery in accordance with claim 1, wherein said depolarizing mixture consists essentially of about 51.6% carbon black, about 25.9% manganese dioxide, about 12.5% paste of fruit of the carica papaya and about 10% urine, by weight.

9. A depolarizing mixture useful in dry cells, the mixture consisting essentially of carbon black, urine, manganese dioxide and paste of fruit of the carica papaya, the said paste and mixture being pressed or compressed.

10. A depolarizing mixture useful in dry cells consisting essentially of about 51.6% carbon black, about 25.9% manganese dioxide, about 12.5% paste of fruit of the carica papaya and about 10% urine, by weight.

11. A depolarizer comprising a pressed body formed by applying pressure to a mixture consisting essentially of carbon black, manganese dioxide, paste of fruit of the carica papaya and urine.

12. A dry cell comprising at least two electrodes, spaced from one another, an external organic electrolyte located between said electrodes; and a depolarizing mixture or internal electrolyte adjacent to one of said electrodes, said mixture including urine, carbon black, manganese dioxide and paste of fruit of the carica papaya.

13. A dry cell according to claim 12, wherein said carbon black is petroleum black.

14. A dry cell according to claim 12, wherein said carbon black is acetylene black.

15. A dry cell according to claim 12, wherein said carbon black is petroleum black.

16. A dry cell according to claim 15, wherein said mixture consists essentially of approximately 51.6% petroleum black, 25.9% manganese dioxide, 12.5% paste of fruit of the carica papaya and 10% urine, by weight.

17. A dry cell comprising at least two electrodes, spaced from one another, an external organic electrolyte located between said electrodes; and a depolarizing mixture or internal electrolyte adjacent to one of said electrodes, said mixture including urine and carbon black, and wherein said external electrolyte consists essentially of 100% paste of fruit of, the carica papaya and said electrodes are made respectively of graphite and zinc.

* * * * *